Patented Feb. 19, 1952

2,585,969

UNITED STATES PATENT OFFICE 2,585,969

SPIROCYCLOHEXANES AND METHODS OF PREPARATION THEREOF

Louis H. Schwartzman and Gilbert Forrest Woods, Jr., Silver Spring, Md., assignors to Chemectron Corporation, Washington, D. C., a corporation of Delaware No Drawing. Application March 20, 1950, Serial No. 150,808

4 Claims. (Cl. 260—576)

This invention relates to compounds of the spirocyclohexane type and methods of preparation thereof.

More particularly, the invention relates to the synthesis of compounds of the spirocyclohexane type, particularly those having analgesic properties such as possessed by morphine and other opiates derived from natural sources.

Considerable effort has been directed in the past toward the synthesis of suitable analgesics as substitutes for morphine and the like, particularly in view of the fact that the principal source of supply of morphine and related compounds is dependent upon natural sources, most of which are presently located in the Orient. In an effort to produce chemically synthesized analgesics domestically on an economically practicable basis, and to provide a source of analgesics independent of natural supplies of raw materials, many attempts have been made to synthesize various analgesics as substitutes for morphine and the like, some of the more recently developed compounds being

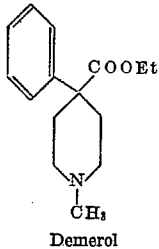

Demerol

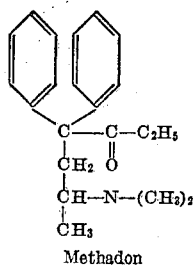

Methadon etc.

Among other things, it has been found that many synthetic compounds produced heretofore, although having some of the analgesic properties of morphine and the like, are not satisfactory from the standpoint of manufacturing costs, and even in some cases are unsuitable for use by human beings because of their high toxicity or side-effects and other undesirable properties.

It is found that compounds of the present invention are not only relatively simple and inexpensive to manufacture from readily available raw materials but, in addition, have satisfactory analgesic properties and are of sufficiently low toxicity to permit safe use by human beings.

In its more specific aspects the present invention pertains to the synthesis of analgesic compositions of the spirocyclohexane type by employing cyclohexanone as a starting material and producing therefrom a large number of new, novel and useful analgesic compounds containing a quaternary carbon atom in the molecule and, in addition, either a primary, secondary, or tertiary amine group.

The invention also provides new and novel methods of preparing the compounds described herein, such methods being particularly advantageous in view of the simplicity of the procedures, economic practicability and comparatively high yields of the intermediates and the end products without the use of complicated or expensive starting materials, apparatus, or processes.

The intermediates required for synthesis of the compounds of the present invention may be prepared, for example, in the manner described in copending application Serial No. 150,806, filed of even date herewith, by using cyclohexanone as a starting material, treating it with a mixture of calcium carbide and potassium hydroxide to yield an acetylenic glycol such as 1,1-ethynylene-bis-cyclohexanol according to the reaction:

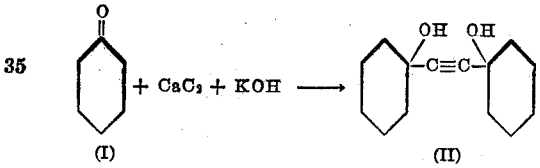

This glycol (II) is then dehydrated to the dieneyne (III) by, for instance, heating the above glycol under reflux conditions with dilute sulfuric acid as follows:

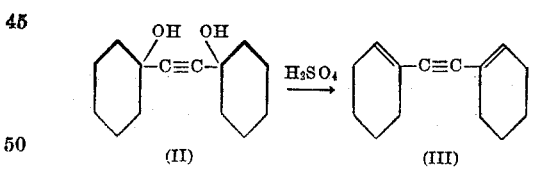

The compound thus obtained is then cyclized and hydrated, for example, by refluxing with formic acid, thus producing as intermediates, cyclic ketones such as spiro[cyclohexane-1,1'-Δ⁹'-tetrahydroindanone-3'] (IV) and its isomer spiro[cyclohexane-1,1'-Δ⁸'-tetrahydroindanone-3'] (V) in accordance with the following reaction:

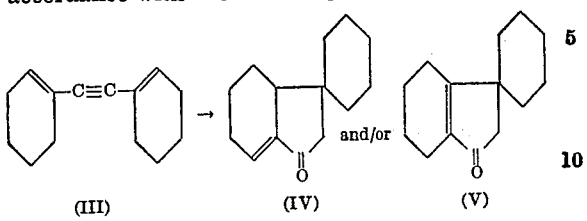

(III)    (IV)    (V)

To produce the analgesic compounds of the present invention, the cyclic ketones (IV) and/or (V) are converted to the aromatic ketone (VI) and subsequently to its oxime (VII) in the well known manner according to the reactions:

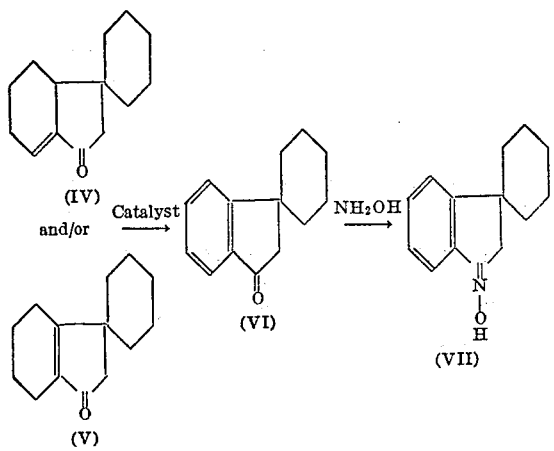

and thereafter the oxime (VII) is hydrogenated in the presence of a catalyst to produce an analgestic spiroindane in accordance with the reaction:

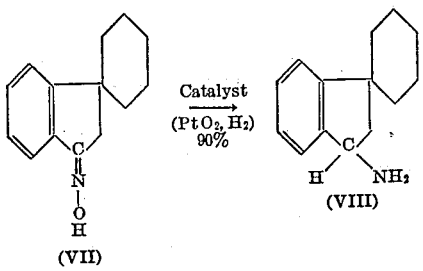

Another spiroindane coming within the scope of the present invention may be prepared by further treatment of the spiroindane (VIII) according to the following reaction:

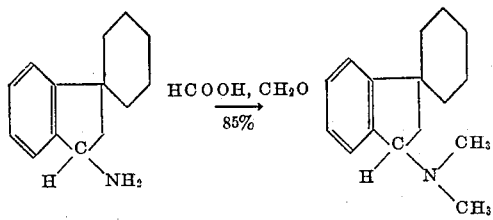

Instead of preparing the oxime as indicated above, the ketones (IV) and/or (V) can be aromatized according to the method described in copending application Serial No. 150,806, filed of even date herewith, to produce an aromatic ketone from which there may be prepared a series of aromatized compounds such as aromatic spirocyclohexanes or spirocyclohexylquinolines, depending upon the desired end products. The following reaction illustrates the aromatization step set forth in that application:

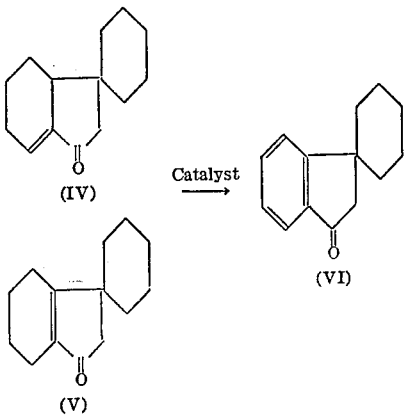

Instead of converting the non-aromatic ketones (IV) and/or (V) into the aromatic ketone (VI), a series of valuable analgesic compounds may be prepared from said non-aromatized ketones as described in copending application Serial No. 150,807, filed of even date herewith.

Various other series of analgesic compounds, in addition to the series of the present invention, may be prepared as set forth in copending applications Serial Nos. 150,809, and 150,810, each filed of even date herewith.

In accordance with the present invention the cyclic ketone is aromatized in the manner described in copending application Serial No. 150,806, filed of even date herewith, and a series of analgesic aromatic spiroindanes is produced from the aromatic ketone.

It is an object of the present invention, therefore, to provide a series of aromatic spiroindanes having analgesic properties. It is a further object of the present invention to provide a series of aromatic spiroindanes having a quaternary carbon atom and, in addition, a primary, secondary, or tertiary amine group. It is a still further object of the invention to provide aromatic aminospiroindanes of the type:

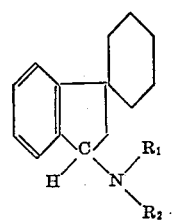

wherein $R_1$ and $R_2$ are selected from the group consisting of hydrogen and lower alkyl groups.

It is a still further object of the present invention to provide methods of preparation of the foregoing compounds.

For purposes of illustration, but without limiting the scope of the patent thereto, representative compounds of the present invention and methods of preparation thereof are described in detail in the following examples:

*Example I*

15 grams of the aromatic ketone spiro [cyclohexane-1,1'-indanone-3'] as described hereinbefore is added to a mixture of hydroxylamine hydrochloride (17.5 grams), pyridine (32 ml.) and anhydrous alcohol (81 ml.) and the solution is refluxed for 3½ hours. Thereafter, the solvent is removed and the crystalline mass is recrystallized from an alcohol-water mixture to yield 14.1 grams of the oxime of the aromatic ketone which melts at 138–139°. This oxime (17.5 grams), in turn, is hydrogenated at room temperature and atmospheric pressure in 100 ml. of glacial acetic acid solution containing 1 gram of platinum oxide catalyst. The catalyst is removed by filtration and the solvent is removed by distillation under reduced pressure. The residue, the acetylated amine, is hydrolyzed by refluxing for three hours in 100 ml. of 20% sodium hydroxide. The amine is isolated from the cooled solution by acid-base extraction and the dried ether solution is distilled in a nitrogen atmosphere under reduced pressure to yield 10½ grams of the aromatic aminospiroindane: spiro [cyclohexane-1,1'-3'-aminoindane] which boils at 115–117°/1 mm., $n_D^{30}=1.5512$. This compound has the formula:

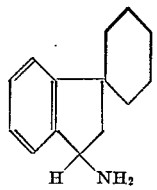

This compound possesses the analgesic effect on white mice described in the chart below:

| M. E. D. | L. D$_{50}$ |
| --- | --- |
| 30 m.g/kg. body wght. | 275 mg./kg. body wght. |

*Example II*

To a solution of 3 grams of the amine, spiro[cyclohexane-1,1'-3'-aminoindane] and 3.5 grams of 90% formic acid, 3.5 grams of a 36% aqueous solution of formaldehyde was added. Upon warming this mixture to room temperature a vigorous evolution of carbon dioxide ensued and lasted for one hour, after which the mixture was refluxed on a steam bath overnight. Isolation of the amine was accomplished in the usual manner. This product was then treated with 30 ml. of 20% sodium hydroxide and 8 ml. of acetic anhydride. The tertiary amine (2.5 grams or 73%) spiro[cyclohexane-1,1'-3'-dimethylaminoindane], isolated from this mixture in the usual manner, boiled at 123–124° (0.8 mm.), $n_D^{35}=1.5400$. This compound has the formula:

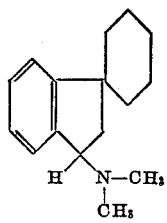

This compound possesses the analgesic effect on white mice described in the chart below:

| M. E. D. | L. D$_{50}$ |
| --- | --- |
| 30 mg./kg. body wght. | 100 mg./kg. body wght. |

*Example III*

The compound spiro[cyclohexane- 1,1' - 3'-methylaminoindane] may also be prepared in the manner described in Example II by employing equimolar quantities of the spiro[cyclohexane-1,1'-3'-aminoindane] and formaldehyde. This compound has the formula:

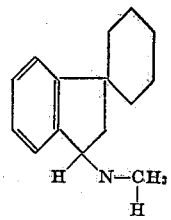

In the foregoing examples it will be understood that in lieu of the methyl group other lower alkyl groups such as ethyl, propyl, etc., may be incorporated in the molecule by proper selection of the reacting materials in the manner obvious to those skilled in the art. Likewise, it will be understood that the alkoxy group may be methoxy, ethoxy, propoxy, etc., the acyl group may be acetyl, propionyl, butyryl, etc., and the halogen may be the chloride, bromide, iodide, fluoride, etc.

The term M. E. D. is used herein as an abbreviation for the minimal effective dosage for 50% of the animals tested. The term L. D$_{50}$ is used herein as an abbreviation for the lethal dosage for 50% of the animals tested.

It will be understood that other modifications may be made in the foregoing examples without departing from the scope of the invention. It is intended, therefore, that the patent shall cover by suitable expression in the appended claims the features of patentable novelty residing in the invention.

We claim:

1. Spirocyclohexanes of the type:

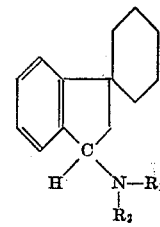

wherein $R_1$ and $R_2$ are selected from the group consisting of hydrogen and lower alkyl groups.

2. Spiro[cyclohexane-1,1'-3'-aminoindane] of the formula:

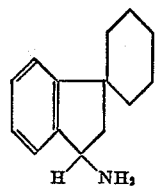

3. Spiro[cyclohexane - 1,1' - 3' - methylaminoindane] of the formula:

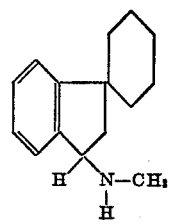

4. Spiro[cyclohexane - 1,1' - 3' - dimethylaminoindane] of the formula:
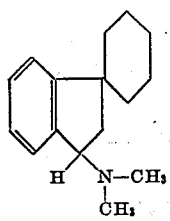
LOUIS H. SCHWARTZMAN.
GILBERT FORREST WOODS, JR.
REFERENCES CITED
The following references are of record in the file of this patent:
Schwartzman, J. Org. Chem., vol. 15, pages 517–425 (1950).